FRAMES FOR ACCOMMODATING CIRCUIT CARDS OR MODULE FRAMES

Filed July 6, 1967 9 Sheets-Sheet 1

Inventors
Denyer Edward Hedger
Anthony John Ayling
By: Watson, Cole, Grindle & Watson
Attorneys Inventors
Denzyn Edward Hedger
Anthony John Ayling
By: Watson, Cole, Grindle & Watson
Attorneys Inventors
Denyer Edward Hedger
Anthony John Agling
By: Watson, Cole, Grindle & Watson
Attorneys Inventors
Denys Edward Hedger
Anthony John Ayling
By Watson, Cole, Grindle & Watson
Attorneys Inventors
Denyer Edward Hedger
Anthony John Ayling
By: Watson, Cole, Grindle & Watson
Attorneys Inventors
Denyer Edward Hedger
Anthony John Ayling
By Watson, Cole, Grindle & Watson
Attorneys Inventors
Denys Edward Hedger
Anthony John Ayling
By Watson, Cole, Grindle & Watson
Attorneys

FRAMES FOR ACCOMMODATING CIRCUIT CARDS OR MODULE FRAMES

Filed July 6, 1967 9 Sheets-Sheet 8

Inventors
Denzyer Edward Hedger
Anthony John Ayling
By: Watson, Cole, Grindle & Watson
Attorneys Inventors
Danyer Edward Hedger
Anthony John Ayling
By Watson, Cole, Grindle + Watson
Attorneys

United States Patent Office 3,458,767
Patented July 29, 1969

3,458,767
FRAMES FOR ACCOMMODATING CIRCUIT CARDS OR MODULE FRAMES

Denyer Edward Hedger, Sarisbury Green, near Southampton, and Anthony John Ayling, Colden Common, England, assignors to Vero Electronics Limited, Southampton, England, a British company Filed July 6, 1967, Ser. No. 651,477
Int. Cl. H02b *1/04*
U.S. Cl. 317—101 6 Claims

ABSTRACT OF THE DISCLOSURE

A rack for accommodating electrical circuit elements having opposed rows of parallel guides into which the sides of the circuit elements can be slid and edge connectors for engagement with the ends of the circuit elements which are retained in the rack as a group by retaining strips extending at right angles to the ends of the edge connectors.

This invention relates to a rack for holding electrical equipment of the type comprising two opposed rows of parallel guides, into which circuit elements can be slid, each with its edges engaged with opposite guides of a pair, and a single row of edge connectors, each of which is associated with and extends at right angles to a pair of opposite guides and has a recess containing electric contacts for establishing electrical connections to the equipment on the circuit element slid into that pair of guides.

The circuit elements may be circuit boards and a rack of the above type for the accommodation of such circuit boards is described in British specification No. 1,000,849. Alternately the circuit elements may be drawer type modules and a rack for the accommodation of such modules is described in British specification No. 1,044,960.

In existing racks of the above type, each of the edge connectors is attached individually to a suitable supporting structure in the rack by two screws, introduced through holes in ears projecting from the ends of the edge connector. Since a rack normally contains a considerable number of edge connectors, this method of assembling the edge connectors in the rack is laborious and expensive.

With a view to overcoming this disadvantage, the invention provides a rack of the above type in which the edge connectors have ears projecting from their ends and are retained in the rack, as a group and without individual attachment to the rack, by a pair of parallel retaining strips which extend at right angles to the edge connectors in abutment with the ears.

The ears of the edge connectors may be accommodated in recesses in the guides, the retaining strips being secured to the rack at their ends.

Alternatively, the ears of the edge connectors may be disposed between longitudinal members of the rack and the retaining strips, the latter being secured at intervals to the longitudinal members by bolts positioned between the edge connectors.

As a further alternative, the guides may have spaced flexible projections defining between them recesses for accommodating the ears of the edge connectors, the edges of the retaining strips being received in opposed grooves in the projections and in longitudinal members of the rack disposed opposite the projections.

Certain embodiments of the invention will now be described in detail, by way of example, with reference to the accompanying drawings, in which.

Figure 5:
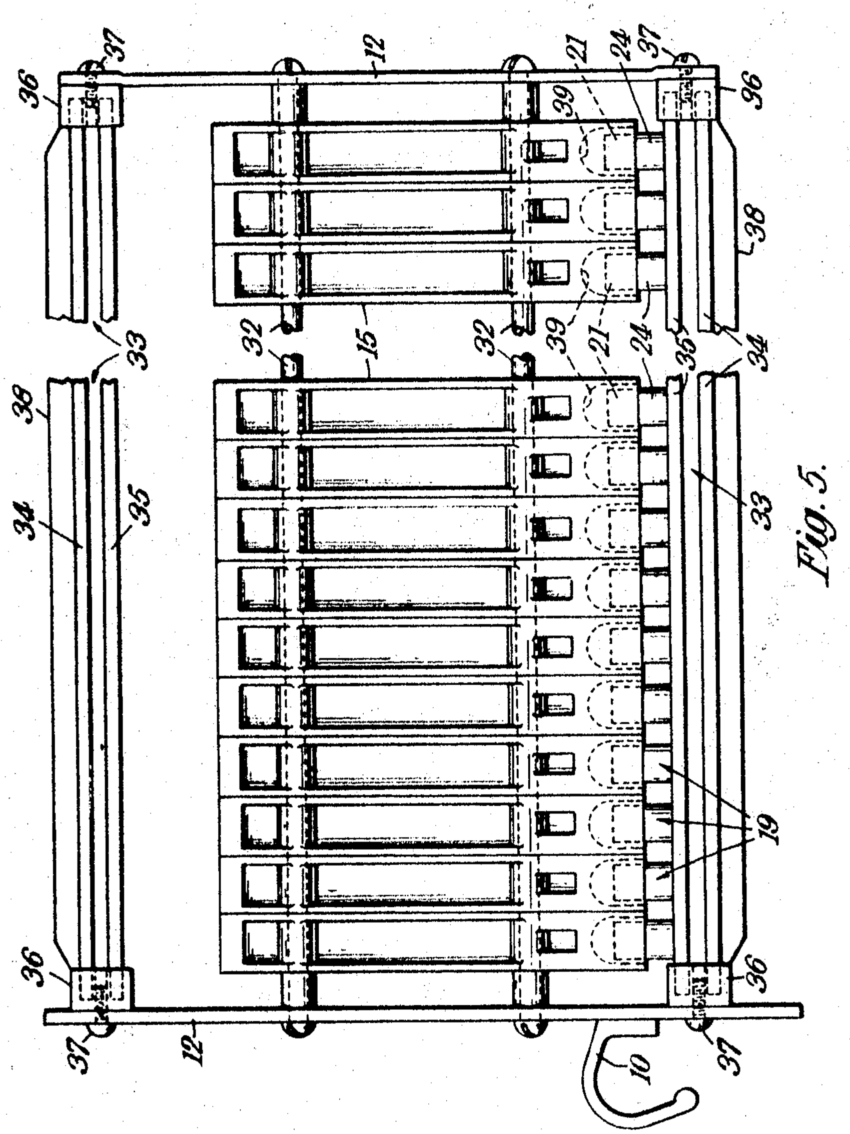
Figure 6:
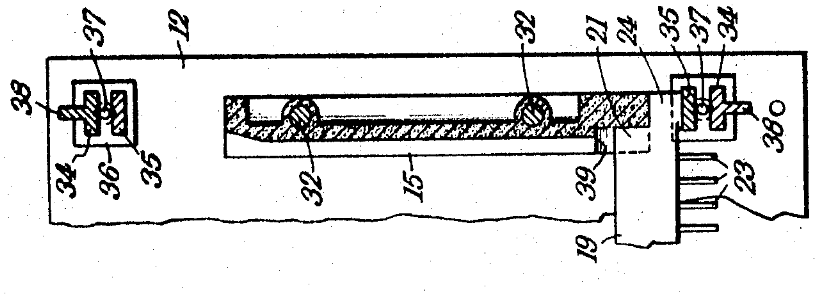
Figure 7:
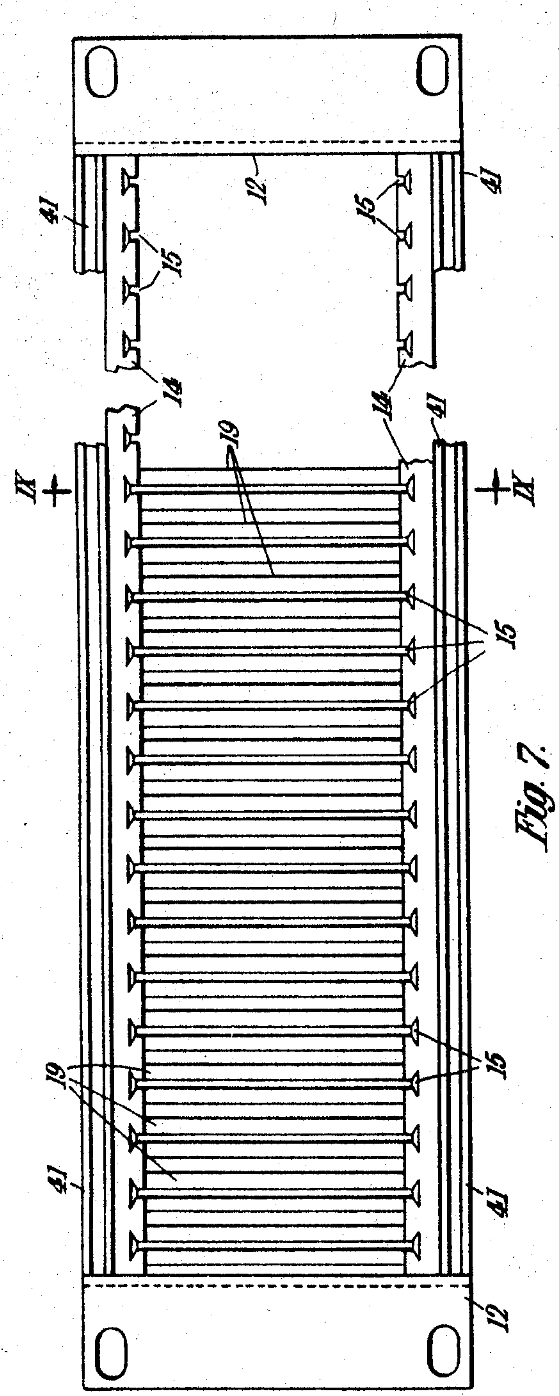
Figure 8:
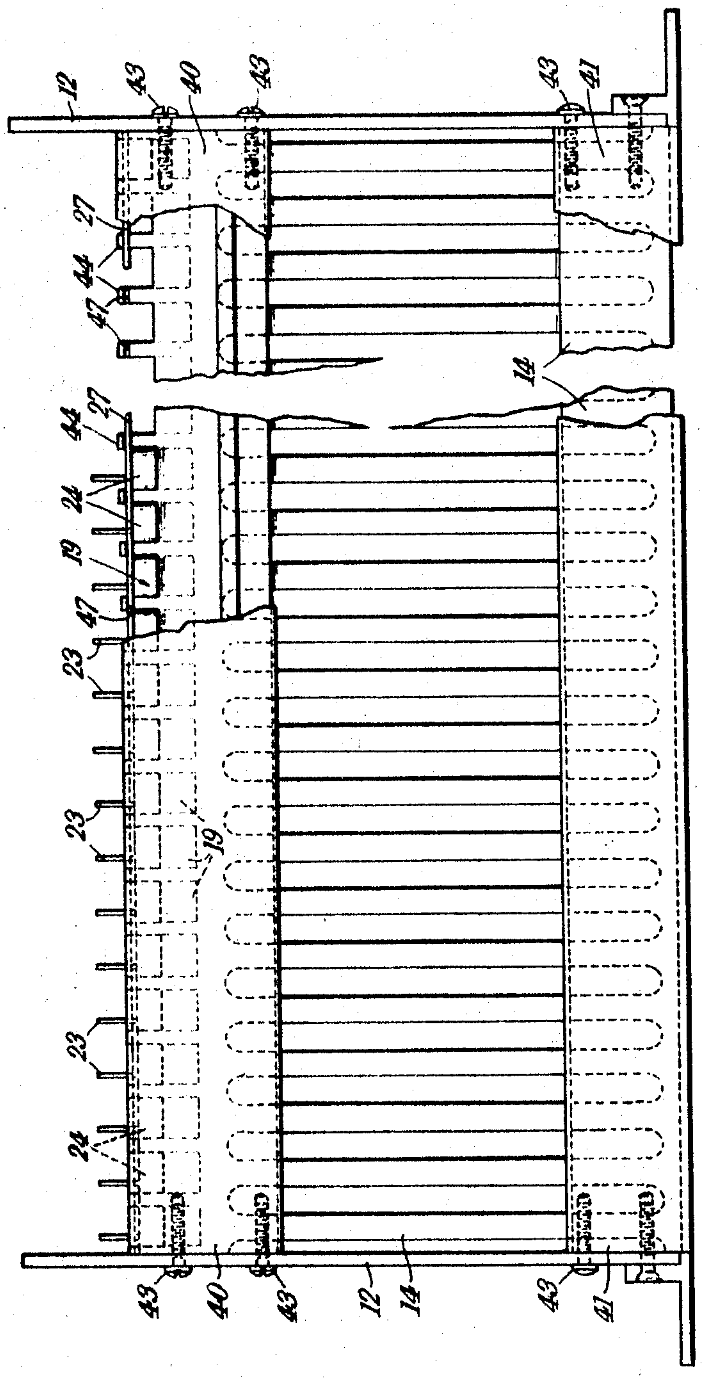
Figure 9:
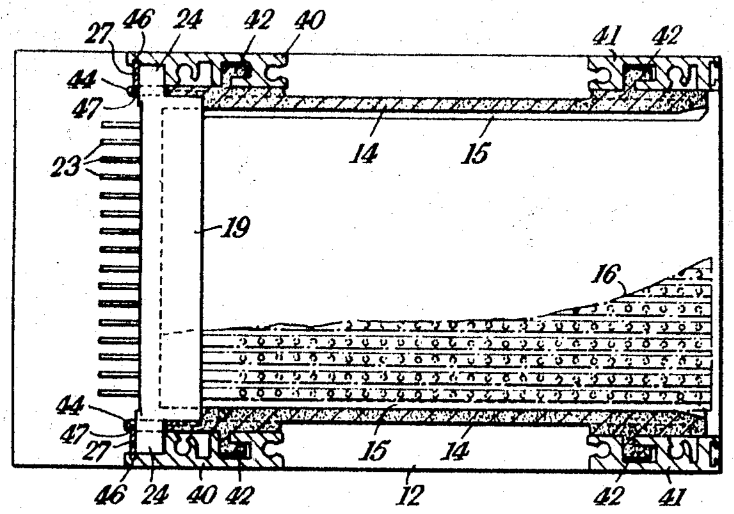
Figure 10:
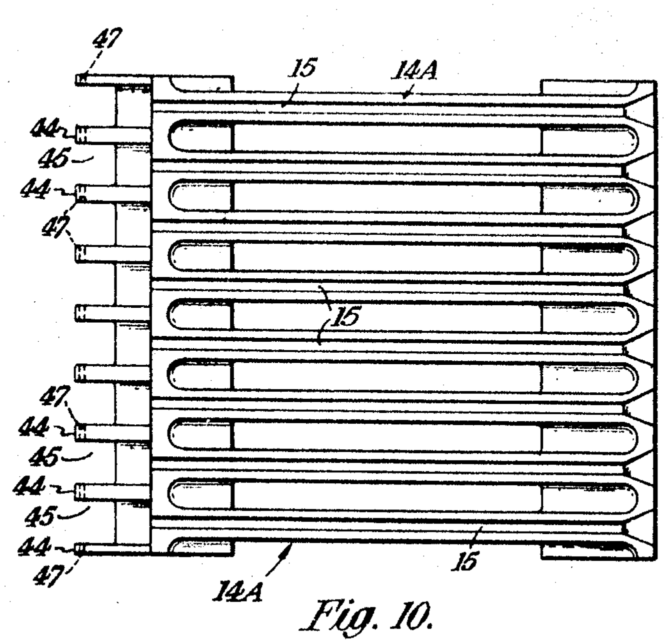
Figure 11:
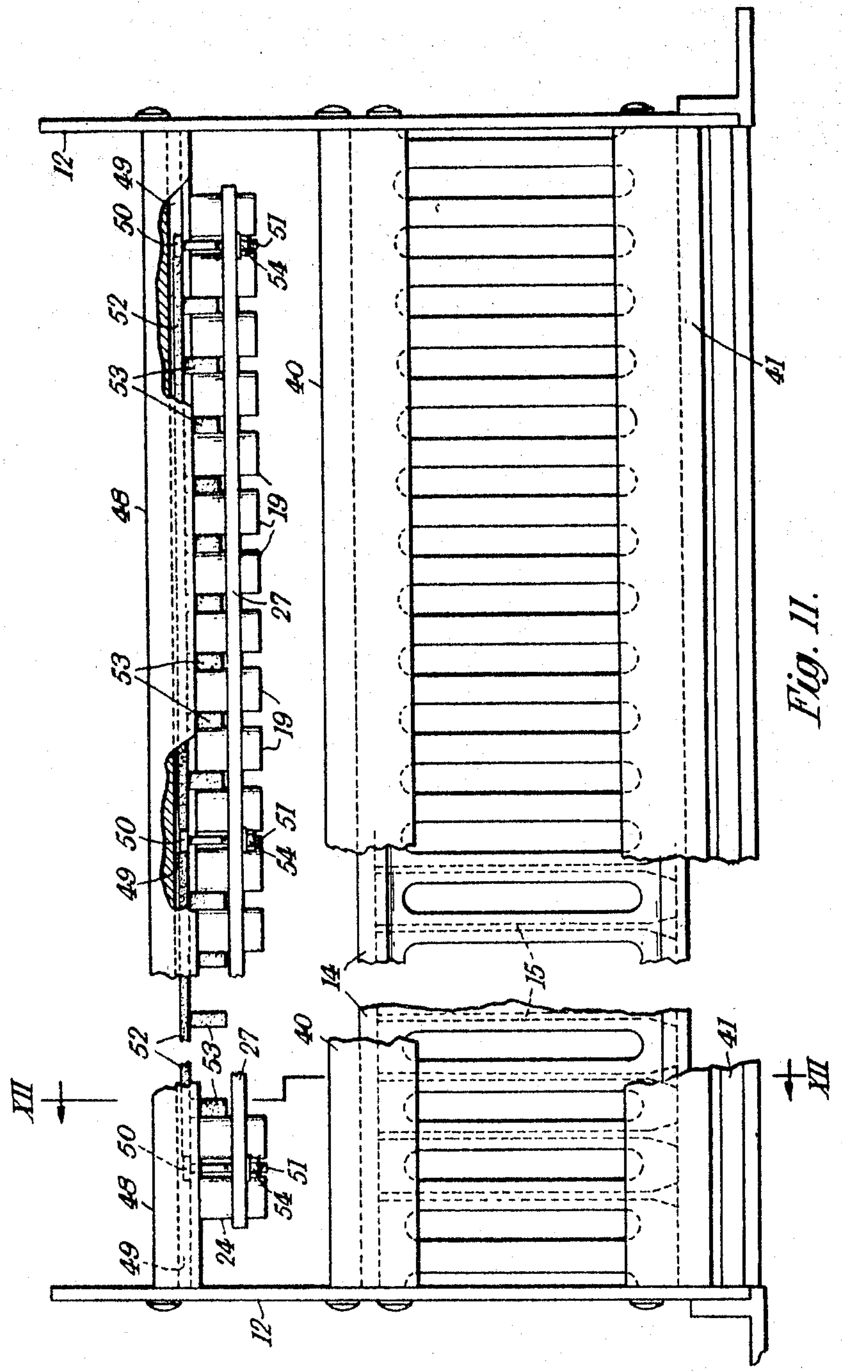
Figure 12:
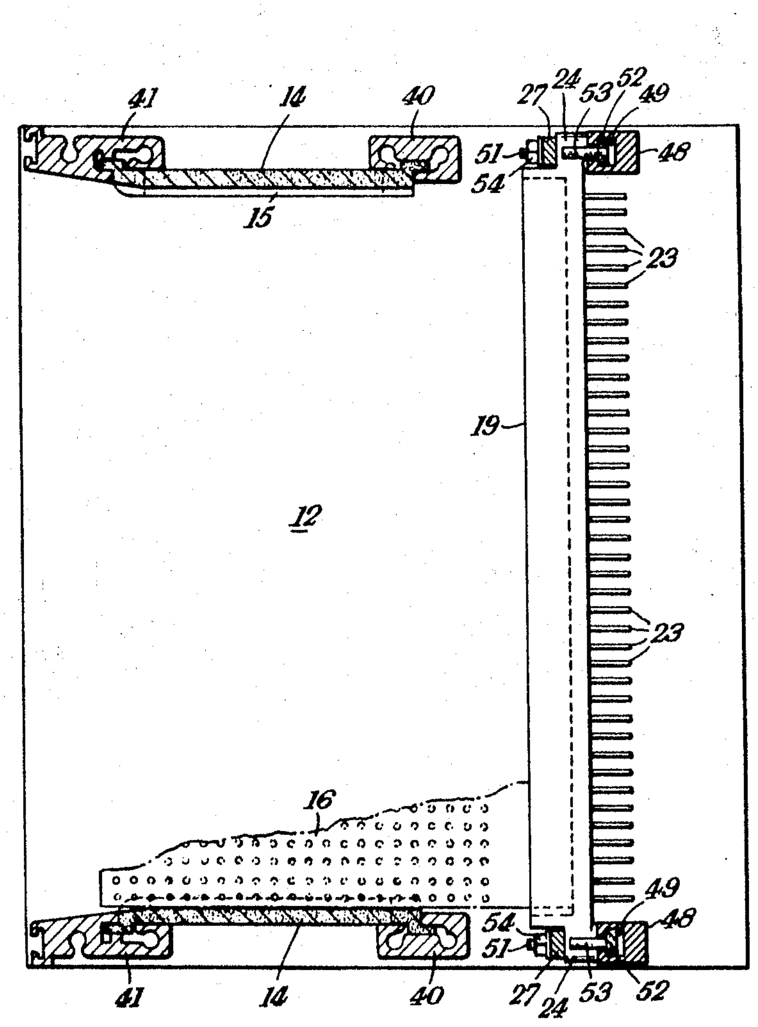

FIG. 5 is a side elevation of a second form of rack designed as a drawer to fit into a large cabinet, FIG. 6 is a section on the line VI—VI in FIG. 5, FIG. 7 is a front elevation of a third form of rack, FIG. 8 is a corresponding plan view, FIG. 9 is a section on the line IX—IX in FIG. 7, FIG. 10 is a plan view of an alternative guide assembly for use with the rack shown in FIG. 7, FIG. 11 is a plan view of a fourth form of rack, and FIG. 12 is a section on the line XII—XII in FIG. 11.

Like reference numerals indicate like parts throughout the figures.

Figure 1:
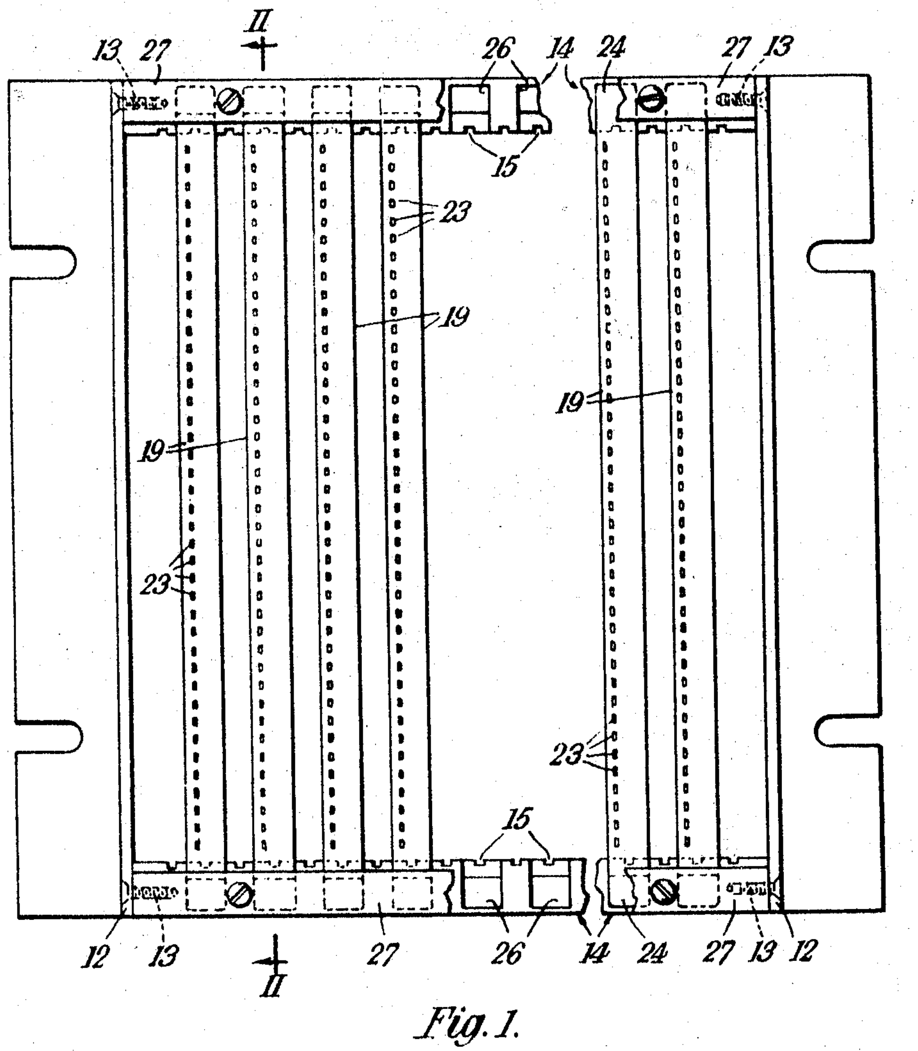
FIG. 1 is a rear elevation of a first form of rack according to the invention.
Figure 2:
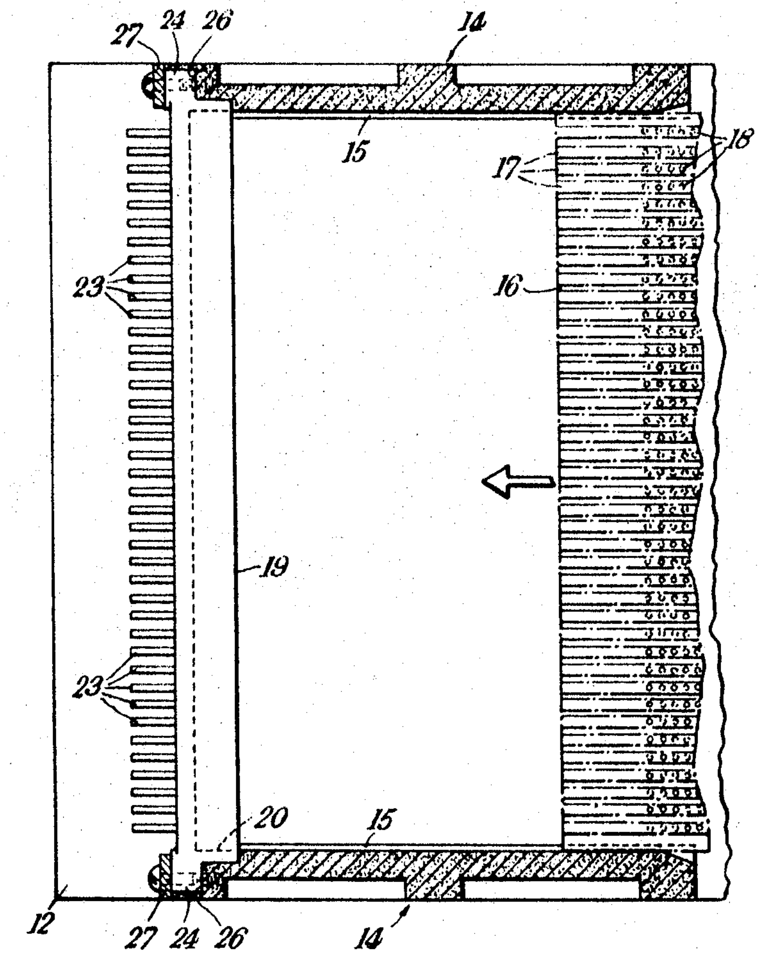
FIG. 2 is a section on the line II—II in FIG. 1.
Figure 4:
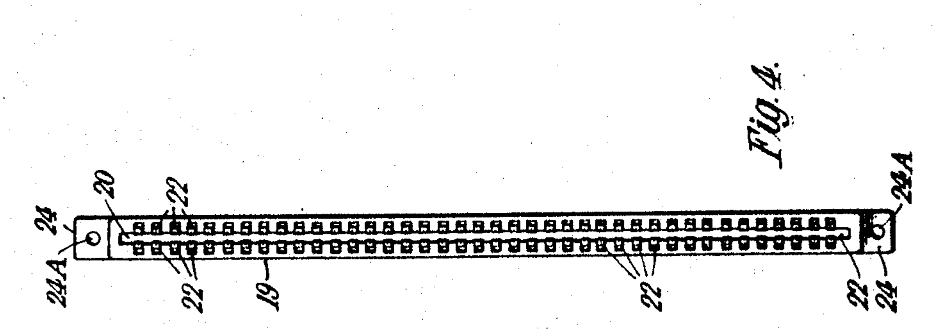
FIG. 4 is a front elevation of one of the edge connectors.

The rack shown in FIGS. 1–4 includes two end plates 12, which may conveniently be of metal, attached by screws 13 to opposite ends of a pair of guide assemblies 14 formed with rows of opposed card guides constituted by grooves 15. The assemblies may be moulded from plastics material, or machined from a solid block of metal or plastics material or formed from metal or plastics sheet. Each pair of opposed guides 15 is adapted to receive the opposite edges of a circuit board 16 slid end wise into the rack from the front as indicated in FIG. 2. The board 16 is of insulating material carrying on one surface parallel strips 17 of copper and is pierced with a multiplicity of holes 18 arranged in a grid pattern. Alternatively the board 16 may be any conventional printed circuit board of suitable size. Circuit components, such for example as transistors, resistors and capacitors, are fitted into the holes 18 where required and the desired circuit established on the board by removing parts of the copper strips 17 as necessary and as described in U.S. specification No. 3,148,438.

When fully inserted into the rack, each circuit board 16 makes electrical contact with an edge connector 19, having a recess 20 to receive the end of the board 16. Contacts 22 in the edge connector establish electrical contact between the copper strips 17 on the board 16 and pins 23 on the rear face of the edge connector, to which appropriate electrical connections are made, as required, in conventional fashion.

Figure 3:
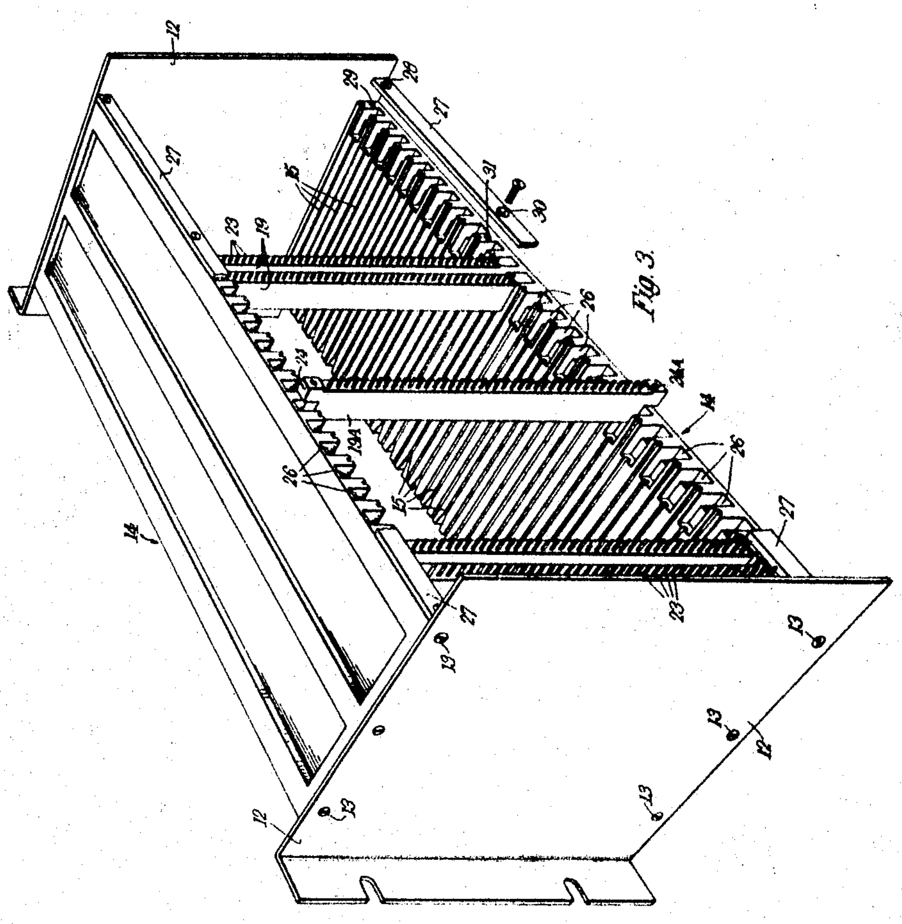
FIG. 3 is a perspective view of the rack shown in FIG. 1.

Each edge connector is formed at its ends with ears 24 which are formed with mounting holes 24A and are fitted into stepped recesses 26 provided in the assemblies 14, as illustrated most clearly in FIG. 3, which shows four edge connectors 19 with their ears fully inserted into pairs of recesses 26 and another edge connector 19A partially inserted into its pair of recesses.

Assembly of the edge connectors in the rack is thus a very simple matter, since they need only to be pushed into the recesses 26. After this they are retained in position by a pair of retaining strips 27. As shown in FIG. 3, each strip 27 has holes 28 at its ends to accommodate securing screws which are screwed into tapped holes 29 in the assemblies 14. In the case of a long rack, it may also be desirable to provide each strip 27 with one or more intermediate holes 30, through which screws may be inserted into tapped holes 31 in the guide assemblies 14 opposite the holes 30. The edge connectors are thus retained in postion without it being necessary to attach screws to them individually.

It will be appreciated that it is also possible to accommodate, in a rack of the kind just described, drawer type modules as described in British specification No. 1,044,960.

In the rack shown in FIGS. 5 and 6, the guides 15 do not form part of a unitary moulding but are individual guides mounted on tie rods 32 extending between the end plates 12. The end plates 12 are joined at each corner by module guide rail assemblies 33. Each of these assemblies includes a pair of rails 34, 35, the ends of which are accommodated in recesses in brackets 36 secured to the end plates 12 by screws 37. The rails 34 have projecting ribs 38 so that the rack can be slid, as a drawer, into a larger cabinet having guides to receive the ribs 38. A handle 10 is provided on the front end plate.

The ears 24 of the edge connectors 19 in this case stand proud of the guides 15, which are provided with shallow recesses 39 which receive the shoulders 21 only of the edge connectors. The rails 34 of the lower guide rail assemblies constitue retaining strips for retaining the edge connectors in position.

In the case of the rack shown in FIGS. 7–10, the end plates 12 are joined by two pairs of aluminum extrusions 40, 41, attached to the end plates by screws 43. The rack includes two guide assemblies 14 moulding from plastics material and formed with two opposed rows of grooves 15 for the circuit boards 16, one of which is shown in FIG. 9. The assemblies 14 are retained in position by tongues 42 (FIG. 9) which engage corresponding grooves in the extrusions 40, 41. The assemblies 14 may extend for the full length of the rack as units, or they may be formed of juxtaposed sections, one of which is shown at 14A in FIG. 10. If desired, the sections may be spaced apart by spacers to provide space for the accommodation of circuit boards carrying sizable pieces of equipment.

As shown in FIG. 10, the assemblies 14 have at one end projections 44, shown also in FIG. 9, defining between them recesses 45 for the reception of the ears 24 of the edge connectors 19. The edge connectors are assembled very simply by dropping their ears 24 into the recesses 45 and then retaining them in position by retaining strips 27. This is accomplished by engaging the outer edge of each strip 27 in a groove 46 in the extrusion 40 and then depressing it to engage the other edge of the strip into grooves 47 in the projections 44.

The rack shown in FIGS. 11 and 12 is similar to that just described but the end plates are joined by an additional pair of aluminum extrusions 48, formed with T-slots 49 into which can be slid endwise the heads 50 of retaining bolts 51 disposed at intervals along the length of the rack. Comb members 52 are preferably fitted into the slots 49 between the bolts 51, the comb members having projections 53 extending between the ears 24 and serving to position the edge connectors 19 in the rack. The ears 24 are accommodated between the extrusions 48 and retaining strips 27 which are held in position by nuts 54 fitted to the bolts 51.

What we claim as our invention as desire to secure by Letters Patent is:

1. A rack for holding electrical equipment, comprising; two opposed rows of parallel guides, into which circuit elements can be slid each with its edges engaged with opposite pairs of guides, a single row of edge connectors, each of which is associated with an extends at right angles to a pair of opposite guides and has a recess containing electrical contacts for establishing electrical contact to equipment on the circuit element, each of said connectors including ears projecting from its opposite ends and abutting at one side against locating surfaces on said rack, and a pair of parallel retaining strips which are secured to the rack and extend at right angles to the edge connectors in abutment with the other sides of said ears to retain said edge connectors in the rack as a group and without individual attachment thereof to the rack.

2. A rack as claimed in claim 1, in which the ears of the edge connectors are accommodated in recesses in the guides and the retaining strips are secured to the rack at their ends.

3. A rack as claimed in claim 1, further comprising longitudinal members and wherein the ears of the edge connectors are disposed between said longitudinal members and the retaining strips, and the retaining strips are secured at intervals to the longitudinal members by bolts positioned between the edge connectors.

4. A rack as claimed in claim 3, in which the bolts have heads accommodated in T-slots in the longitudinal members.

5. A rack as claimed in claim 4, which includes comb members, disposed in the T-slots between the heads of the bolts and having projections which extend between and position the ears of the edge connectors.

6. A rack as claimed in claim 1, in which the guides have spaced flexible projections defining between them recesses for accommodating the ears of the edge connectors, and the edges of the retaining strips are received in opposed grooves in the projections and in longitudinal members of the rack disposed opposite the projections.

References Cited

UNITED STATES PATENTS

| | | | |
|---|---|---|---|
| 3,184,069 | 5/1965 | Rosenberg | 211—41 |
| 3,197,731 | 7/1965 | Beale | 211—41 X |
| 3,271,626 | 9/1966 | Howrilka | 211—41 X |
| 3,288,301 | 11/1966 | Kent | 211—41 X |
| 3,335,386 | 7/1967 | Upton | 339—17 |

CHANCELLOR E. HARRIS, Primary Examiner

U.S. Cl. X.R.

211—41, 177; 312—111; 339—17